United States Patent

Hassel et al.

Patent Number: 4,539,912
Date of Patent: Sep. 10, 1985

[54] CAR BRIDGING ARRANGEMENT FOR HIGH SPEED RAILWAY VEHICLES

[75] Inventors: Helmut Hassel, Donauwörth; Reimund Stark, Griesbeckerzell, both of Fed. Rep. of Germany

[73] Assignee: Messerschmidt-Böelkow-Blohm Gesellschaft mit beschränkter Haftung, Munich, Fed. Rep. of Germany

[21] Appl. No.: 386,606

[22] Filed: Jun. 9, 1982

[30] Foreign Application Priority Data

Jun. 24, 1981 [DE] Fed. Rep. of Germany ....... 3124682

[51] Int. Cl.³ .............................................. B60D 5/00
[52] U.S. Cl. ..................... 105/8 R; 105/15; 105/18; 296/1 S
[58] Field of Search ............... 137/347, 349; 105/8 A, 105/15, 18, 20, 21, 8 R, 10, 11; 296/1 S; 180/903

[56] References Cited

U.S. PATENT DOCUMENTS

| | | | |
|---|---|---|---|
| 2,188,632 | 1/1940 | Ragsdale | 105/8 A |
| 4,102,548 | 7/1978 | Kangas | 296/1 S |
| 4,452,163 | 6/1984 | Ayeva | 105/11 |

FOREIGN PATENT DOCUMENTS 2451852 10/1980 France ................................. 296/1 S

OTHER PUBLICATIONS

Washington Post—9/2/1975—p. D9—picture and caption titled "Windbag".

Primary Examiner—David A. Scherbel
Assistant Examiner—Glenn B. Foster
Attorney, Agent, or Firm—Toren, McGeady, Stanger, Goldberg & Kiel

[57] ABSTRACT

An arrangement for bridging adjacent cars in high speed railway vehicles composed of an inflatable chamber bellows section which extends entirely or partially about the outer structure of the cars wherein the stiffness of the bellows section may be automatically adjusted to respective requirements of high speed travel and travel through curves in such a manner that the internal pressure in the chambers of the bellows section which is produced by inflating the section is controlled in a stepless manner or in individual steps by a control system supplied with fluid pressure through the compressed air system of the vehicle or from a compressor.

17 Claims, 13 Drawing Figures

CAR BRIDGING ARRANGEMENT FOR HIGH SPEED RAILWAY VEHICLES

The present invention relates to an arrangement for connecting or bridging adjacent cars of a high speed railway vehicle which is composed of an inflatable chamber bellows section which extends partially or entirely around the external structure of the cars.

In car bridging arrangements which have become known in the prior art, hollow rubber tori cushions are used which are not airtight and which are therefore aerodynamically disadvantageous due to the fact that the gap between adjacent cars is not provided with a covering which is flush with the outer surface of the cars.

Another type of arrangement known in the prior art relates to so-called concertina walls or bellows which also fail to provide a smooth outer surface and which are open at the bottom thereby permitting draft air, dirt, and substantial noise levels to penetrate.

The present invention is directed toward the provision of a car bridging arrangement which will overcome the aforementioned disadvantages and which may be automatically adjusted with respect to its stiffness relative to the respective requirements of travel of the vehicle at high speeds and through curves.

SUMMARY OF THE INVENTION

Briefly, the present invention may be defined as a system for joining adjacent cars of a high speed railway vehicle to provide an aerodynamically advantageous smooth outer surface therefor comprising inflatable chamber bellows means extending essentially about the outer structure of the vehicle between the ends of adjacent cars, said bellows means being structured to define internal pressure chamber means capable of being pressurized to effect inflation of the bellows means, fluid pressure source means for supplying fluid pressure to the chamber means, and a control system for controlling the supply of fluid pressure to the internal pressure chamber means from the fluid pressure source means. The fluid pressure source means of the invention may be the compressed air system of the vehicle itself or the fluid pressure may be supplied from a separate air compressor. The internal pressure chamber means of the bellows means may comprise a single chamber or multiple chambers, and the inflation pressure thereof may be controlled in a stepless manner or in a step-by-step manner.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
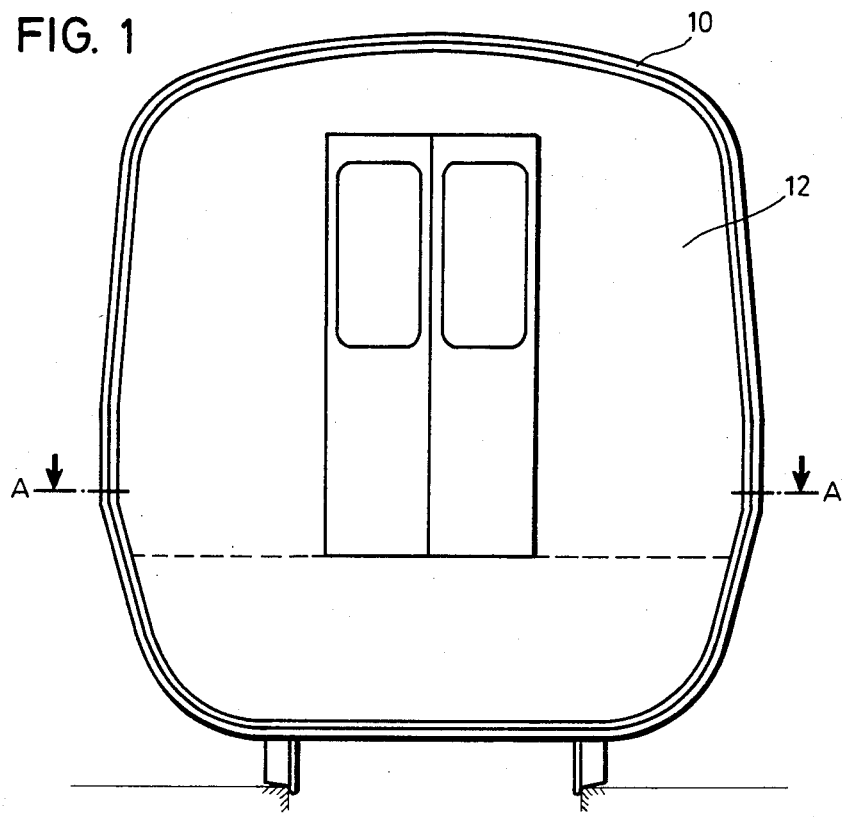
FIG. 1 is an end view of a car structure having the hollow chamber bellows section of the present invention attached thereto.
Figure 2:
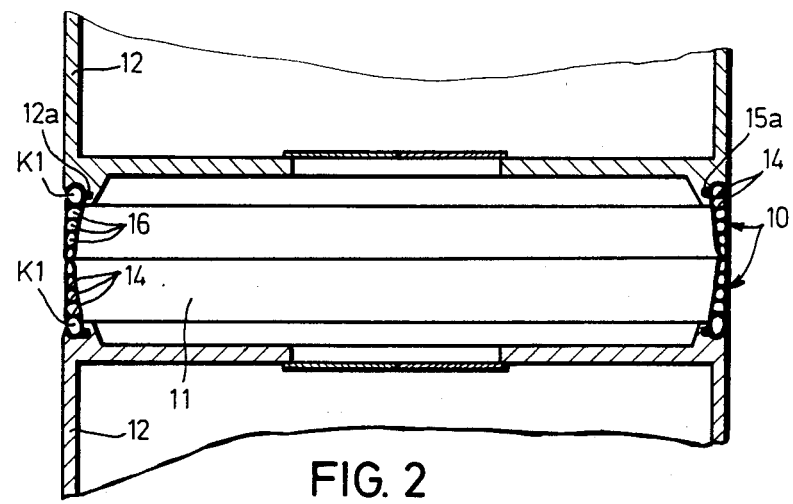
FIG. 2 is a sectional view taken along the line A—A of FIG. 1.

Referring now to the drawings wherein similar reference numerals are used to identify like parts throughout the various figures thereof, there is shown, particularly in FIGS. 1 and 2, a transition portion formed between a pair of adjacent railway cars which are coupled together. As indicated in the drawings, a space or gap 11 is formed between a pair of adjacent cars 12 and the space must be bridged by appropriate means. As previously mentioned herein, this space has in the past either been left free or it has been closed laterally and at the top thereof by means of devices such as hollow rubber tori or concertina walls. No sealing has been provided at the bottom of the space so that in conventional systems, not only does substantial noise penetrate the interior of the vehicle during travel, but also dust and water may also create problems. Embodiments such as these performed in accordance with the prior art have been found unacceptable in high speed vehicles because they result in excessive aerodynamic resistance.

The present invention is directed toward elimination of these disadvantages and with the invention there is provided a single-chamber or multiple-chamber hollow bellows section 10 having a fastening bulge 15 which is arranged in a guide 12a at the outer contour of each of the cars 12. A single-chamber hollow bellows section may be sufficient under certain circumstances. However, in the embodiment illustrated in FIG. 2a there is shown an arrangement comprising multiple chambers.

Figure 2A:
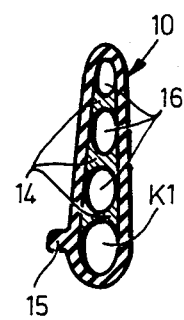
FIG. 2a is a cross-sectional view taken through a multiple chamber bellows section with fastening bulges.

In the embodiment of FIG. 2a, the multiple hollow chamber bellows section 10 is formed with a plurality of air chambers 16 and with a first chamber K1. These chambers are arranged so as to be automatically controlled by a compressed air system of the vehicle itself so that the stiffness of the bellows section may be adjusted to the respective high speed travel and to travel around curves.

Figure 3:
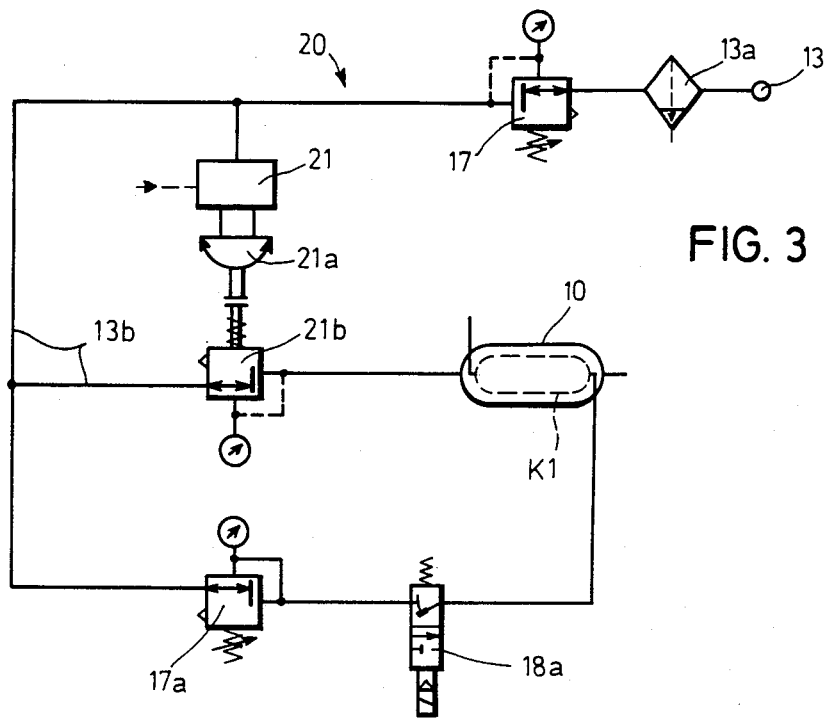
FIG. 3 is a schematic block diagram of a first embodiment for an automatic control system for controlling the internal pressure of the bellows section.

For this purpose, there is shown in FIG. 3 an embodiment of a control system in accordance with the present invention. An existing compressed air line 13 is provided in which a pressure of 6 bar prevails and which is connected through a filter 13a to a pressure regulator 17 which is in communication through a compressed air line 13b with the multiple-chamber bellows section 10 and with the chamber K1. In the line 13b there is connected an electropneumatic position regulator 21 with a pneumatic rotary drive 21a and with a manometer regulator 21b by means of which an automatic control of the internal pressure of the air chambers is performed. An additional control circuit can be arranged in this control system for separate control of the air pressure in the chamber K1 which will ensure constant pressure in the chamber K1 for supporting a connection with the fastening bulge 15 which may comprise a screw connection or for contact pressure of an attachment wire such as an attachment wire 15a. For this purpose a particular regulator 17a with, for example, three bars and a 3/2-way solenoid valve 18a are provided which act directly onto the chamber K1.

Figure 4:
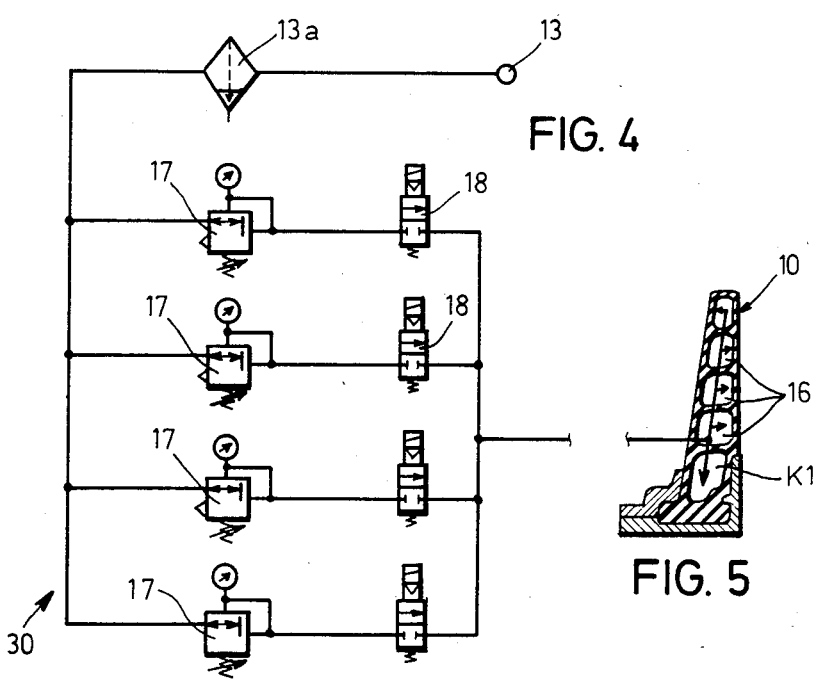
FIG. 4 is a schematic block diagram of a second embodiment of the internal pressure control system of the present invention wherein a multiple chamber bellows system is provided.
Figure 5:
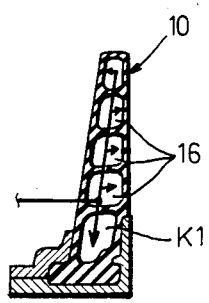
FIG. 5 is a sectional view of a multiple chamber section with variable compressed air supply.

FIG. 4 shows an embodiment wherein the internal pressure of each individual chamber 16 in the bellows section 10 may be variably adjusted. Additionally, in the case of the embodiment of FIG. 4, a filter 13a is connected to the compressed air line 13 of the vehicle, a pressure regulator 17 with a multiple-way valve being connected after the filter 13a for each chamber 16 and K1. The valve is, for example, a 2/2-way solenoid valve. An additional control of the air pressure for maintaining the pressure in chamber K1 constant is readily also possible in this case. This control circuit is identified with the reference numeral 30.

Figure 6:
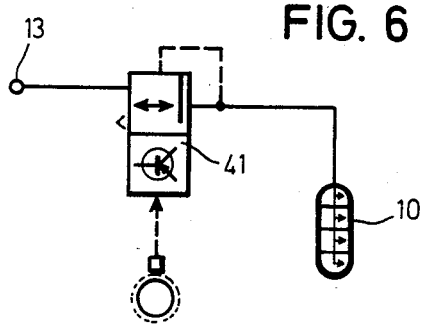
FIG. 6 is a block diagram of an embodiment of the invention with analog control.
Figure 7:
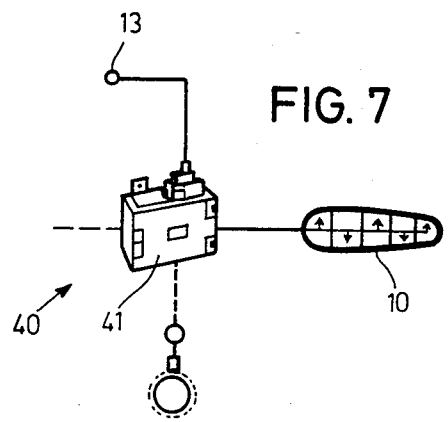
FIG. 7 is a schematic illustration of the construction according to FIG. 6.

An analog control circuit of another embodiment which is illustrated in FIGS. 6 and 7 is identified with reference numeral 40. A speed pressure converter 41 operating in the range between 0 to 2 bars is connected in the compressed air line of the vehicle having a pressure of 6 bars. The figures of the drawing illustrate the features of the invention so that further detailed explanation is considered unnecessary.

Figure 8:
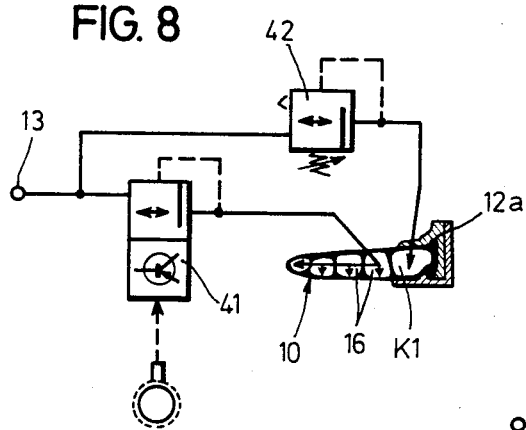
FIG. 8 is a schematic block diagram of an analog control system with additional separate control of a first chamber of the bellows system.
Figure 9:
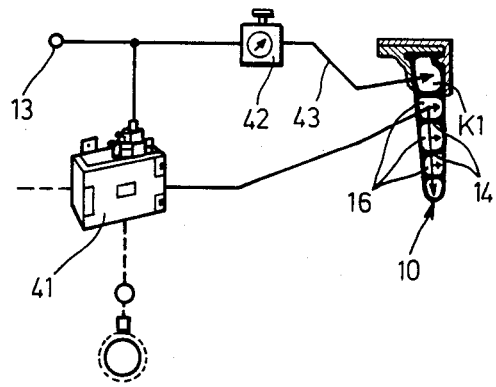
FIG. 9 is a schematic illustration of the structure according to FIG. 8.

FIGS. 8 and 9 show an embodiment which is essentially based upon the arrangement depicted in FIGS. 6 and 7 and which is provided only with an additional control circuit 42 for the separate constant pressure control of the chamber K1 of the multiple-chamber hollow section 10. A pressure reducing valve operating, for example, in the range of 2 bars is connected in the line 43 leading directly from the compressed air line 13 of the vehicle to the chamber K1 so that a constant pressure is always maintained in K1.

As shown in FIGS. 6 and 7, the automatic control of the other section chambers 16 is effected by a speed pressure converter 41. Again, with regard to this aspect of the invention, the drawing makes further explanation superfluous.

Figure 10:
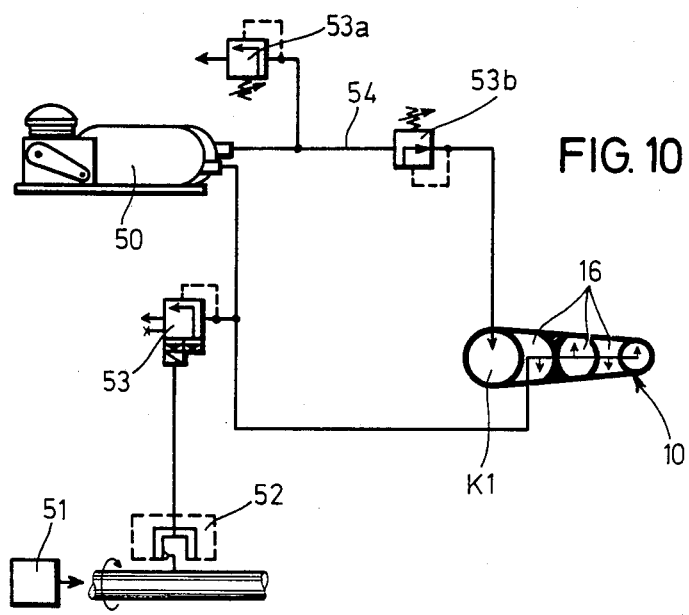
FIG. 10 is a schematic block diagram of an embodiment utilizing a compressor.

FIG. 10 shows an embodiment wherein the compressed air line of the vehicle is not utilized and a compressor 50 is used instead to supply the compressed air. For effecting control of the system, either a tachometer generator 52 or a brake control system are used to which a pulse generator 51 is assigned which is connected to a pressure regulator 53 and performs control of the air chamber 16. For applying constant pressure to the chamber K1, a direct line 54 with a pressure reducing valve 53b leads from the compressor 50 as well as another pressure regulator 53a which ensures that in those cases wherein the pressure exceeds the adjusted value, the excess pressure will be conducted into the atmosphere.

Figure 11:
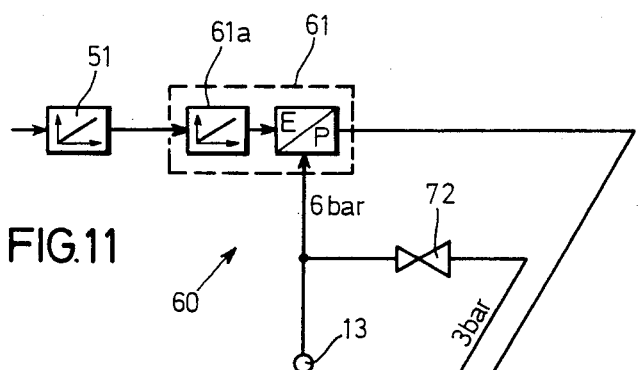
FIG. 11 is a schematic block diagram of an analog converter system with an integrated impedance converter.

An analog control circuit in accordance with another embodiment of the invention is depicted in FIG. 11. An analog converter with an integrated impedance converter 61a is connected between the compressed air line of the vehicle having a pressure of 6 bars and the tachometer generator 51. The analog converter 61 converts a stepless input voltage from the tachometer generator 51 into a similarly stepless pressure in the multiple-chamber air bellows 16 in accordance with the speed of travel. In this embodiment, a pressure regulator 72 separately applies a continuous constant pressure of 3 bars to the chamber K1.

Figure 12:
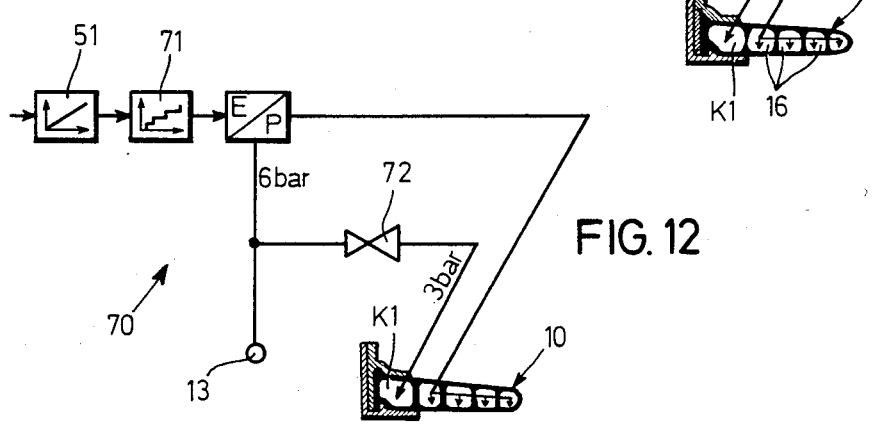
FIG. 12 is a schematic block diagram of an analog converter system having an integrated electronic circuit for discrete operation of the input signal.

An analog control circuit in accordance with a further embodiment of the invention is shown in FIG. 12 with this embodiment differing from the arrangement in accordance with FIG. 11 in that, instead of an impedance converter, an electronic circuit 71 for providing a discrete formation of the input signal is used and wherein the pressure is generated in the bellows section 10 in several steps in accordance with the vehicle speed.

As a result of the proposed arrangements of the invention for a car bridging structure, a number of special advantages may be achieved. For example, substantial reduction in aerodynamic resistance will be effected due to the fact that the outer surface of the entire vehicle will be formed with a smooth, flush configuration. This will have a substantial influence upon energy consumption. Furthermore, great stability with respect to shape and air-tightness will be provided and a smooth outer surface may be achieved which will have an effect upon the sound insulation on the inner part of the cars and, thus, on the passenger compartments. As a result of the measures provided in accordance with the invention, the outer car bridging structure will have a stable and aerodynamic outer contour which will produce low friction forces during high speed travel and which will exhibit required flexibility during slow travel through curves.

While specific embodiments of the invention have been shown and described in detail to illustrate the application of the inventive principles, it will be understood that the invention may be embodied otherwise without departing from such principles.

What is claimed is:

1. A system for joining adjacent cars of a railway vehicle to provide an aerodynamically advantageous smooth outer surface therefor comprising: inflatable chamber bellows means extending essentially about the outer structure of the vehicle between the ends of adjacent cars, said bellows means being structured to define fluid-tight internal pressure chamber means capable of being pressurized to effect inflation of said bellows means; fluid pressure source means for supplying fluid pressure to said chamber means; and system control means responsive to operating characteristics of said railway vehicle for controlling the supply of fluid pressure to said internal pressure chamber means from said fluid pressure source means in order to regulate the fluid pressure levels therein thereby to adjust physical characteristics of said inflatable chamber bellows means in accordance with changes in the operating characteristics of said vehicle.

2. A system according to claim 1 wherein said fluid pressure supply is controlled in a stepless manner.

3. A system according to claim 1 wherein said fluid pressure supply is controlled in a step-by-step manner.

4. A system according to claim 1 wherein said internal pressure chamber means comprise a single internal pressure chamber.

5. A system according to claim 1 wherein said internal pressure chamber means comprise a plurality of internal pressure chambers.

6. A system according to claim 1 wherein said fluid pressure source means comprise a compressed air system of said vehicle.

7. A system according to claim 1 wherein said fluid pressure source means comprise a separate air compressor for said system.

8. A system according to claim 1 wherein said inflatable chamber bellows means comprise stiffening ribs arranged within said bellows means and configured in such a manner that said bellows means is made softer in the direction of travel as opposed to directions transversely thereof and forms a smooth outer surface.

9. A system according to claim 5 wherein said plurality of chambers include a first fluid pressure chamber located at a fastening connection of said bellows means whereby said bellows means is attached to said car, said first fluid pressure chamber being separately supplied with fluid pressure through a pressure regulator with an adjustable constant pressure.

10. A system according to claim 5 or 9 wherein said system control means operate to supply and maintain a given pressure in each of said chambers in said bellows means by means of separate pressure regulators and position regulators.

11. A system according to claim 1 wherein said system control means includes a pressure converter operating in accordance with the speed of said vehicle and operatively arranged with said fluid pressure source means in front of said bellows means.

12. A system according to claim 9 wherein said control system means include a pressure reducing valve arranged in a compressed air supply line of said fluid pressure source means for said first fluid pressure chamber of said bellows means.

13. A system according to claim 1 wherein said control system means includes a pulse generator controlled by a tachometer generator or by a brake control system of said vehicle for automatic control and adjustment of the fluid pressure in said bellows means.

14. A system according to claim 8 wherein said stiffening ribs are formed with different cross-sectional thicknesses.

15. A system according to claim 1 wherein said control system means include an analog converter system with an impedance converter being integrated in a control section of said analog converter system.

16. A system according to claim 1 wherein electronic circuit means for providing a discrete formation of an input signal is integrated into said control system means.

17. A system according to claim 1 wherein said system control means is responsive to the speed of said vehicle and operates to control said fluid pressure to change the stiffness of said inflatable chamber bellows means in accordance with changes in said vehicle speed.

* * * * *